(12) United States Patent
Pierce et al.

(10) Patent No.: US 12,276,294 B2
(45) Date of Patent: Apr. 15, 2025

(54) BLIND FASTENERS AND METHODS OF FASTENING

(71) Applicant: Howmet Aerospace Inc., Pittsburgh, PA (US)

(72) Inventors: Troy Don Pierce, Hewitt, TX (US); Robert B. Wilcox, McGregor, TX (US); Justin Branch, Waco, TX (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 349 days.

(21) Appl. No.: 17/594,569

(22) PCT Filed: May 15, 2019

(86) PCT No.: PCT/US2019/032349
§ 371 (c)(1),
(2) Date: Oct. 22, 2021

(87) PCT Pub. No.: WO2020/231416
PCT Pub. Date: Nov. 19, 2020

(65) Prior Publication Data
US 2022/0128077 A1    Apr. 28, 2022

(51) Int. Cl.
*F16B 19/10* (2006.01)
*F16B 37/00* (2006.01)

(52) U.S. Cl.
CPC ...... *F16B 19/1072* (2013.01); *F16B 19/1045* (2013.01); *F16B 37/002* (2013.01)

(58) Field of Classification Search
CPC .......................... F16B 19/1054; F16B 19/1045
(Continued)

(56) References Cited

U.S. PATENT DOCUMENTS 3,412,639 A  * 11/1968  Sauter ................. F16B 19/1054
                                                              411/954
4,137,817 A  *  2/1979  Siebol ................. F16B 19/1054
                                                              411/43
(Continued)

FOREIGN PATENT DOCUMENTS

CN        208534942 U     2/2019
DE          3336157 A1    4/1985
(Continued)

OTHER PUBLICATIONS

International Search Report and Written Opinion of the International Searching Authority for International Application No. PCT/US2019/032349 mailed Feb. 14, 2020.

*Primary Examiner* — Flemming Saether
(74) *Attorney, Agent, or Firm* — K&L Gates LLP

(57) ABSTRACT

Blind fasteners and methods of fastening are provided. A blind fastener comprises a sleeve and a mandrel. The sleeve is adapted for installation into a threaded bore in a structure. The sleeve comprises a head portion configured to receive a torque, a first sleeve end, a second sleeve end, an elongate portion extending intermediate the first sleeve end and the second sleeve end, and a cavity extending from the first sleeve end to the second sleeve end. The mandrel is at least partially disposed through the cavity of the sleeve. The mandrel comprises a first mandrel end disposed adjacent to the first sleeve end. The first mandrel end comprises an enlarged portion having a diameter greater than a diameter of the cavity. The elongate portion is configured to at least partially deform into threads of the threaded bore responsive to forcible contact between the enlarged portion and the sleeve.

17 Claims, 14 Drawing Sheets

(58) Field of Classification Search
USPC .................................................. 411/43, 69
See application file for complete search history.

(56) References Cited

U.S. PATENT DOCUMENTS

| | | | | | |
|---|---|---|---|---|---|
| 4,407,619 | A | * | 10/1983 | Siebol | H05K 5/02 411/69 |
| 4,765,010 | A | * | 8/1988 | Jeal | B21H 3/022 470/11 |
| 4,863,325 | A | * | 9/1989 | Smith | F16B 19/1054 411/70 |
| 5,006,024 | A | * | 4/1991 | Siebol | F16B 19/1054 411/70 |
| 5,397,205 | A | * | 3/1995 | Diepeveen | B21J 15/02 29/523 |
| 5,689,873 | A | * | 11/1997 | Luhm | B23B 41/00 411/501 |
| 6,081,984 | A | * | 7/2000 | Sherry | F16B 21/205 29/523 |
| 9,011,057 | B2 | * | 4/2015 | Asakura | F16B 19/1063 411/533 |
| 10,710,146 | B2 | * | 7/2020 | Corbett | B21J 15/045 |
| 10,837,482 | B2 | * | 11/2020 | Palm | F16B 13/0841 |
| 2004/0067121 | A1 | | 4/2004 | Huang et al. | |
| 2005/0281633 | A1 | | 12/2005 | Mercer | |
| 2011/0206477 | A1 | | 8/2011 | Brewer et al. | |
| 2017/0218996 | A1 | * | 8/2017 | Takeda | F16B 37/00 |
| 2022/0120306 | A1 | * | 4/2022 | Wilcox | F16B 19/1054 |

FOREIGN PATENT DOCUMENTS

| | | | |
|---|---|---|---|
| DE | 3619826 A1 | | 12/1987 |
| JP | 51-22963 | * | 2/1976 |
| JP | 2017-198224 A | | 11/2017 |

* cited by examiner

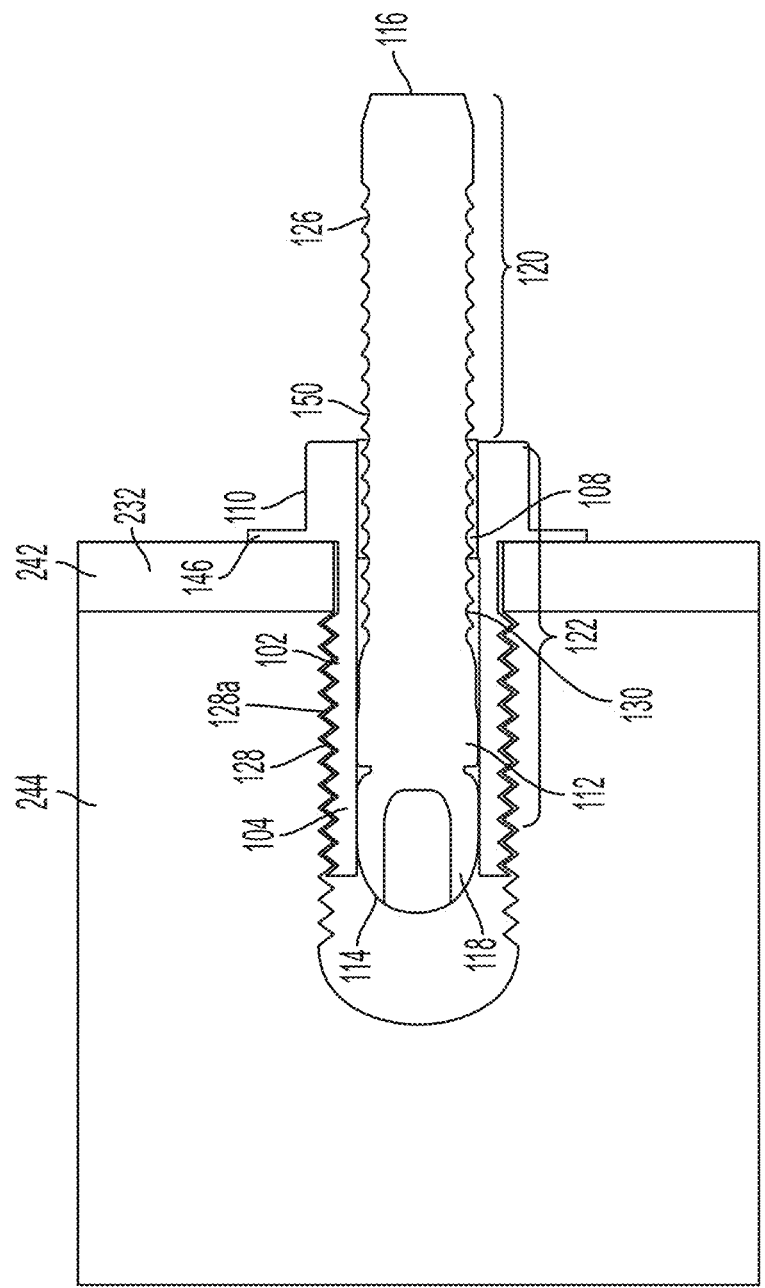

BLIND FASTENERS AND METHODS OF FASTENING

FIELD OF USE

The present disclosure relates to blind fasteners and methods of fastening.

BACKGROUND

Vehicle frames, storage racks, solar panel sub-structures, aircraft parts, and other structures can include numerous mechanical fasteners. For example, a threaded fastener (e.g., a threaded bolt, a threaded structural fastener) can be installed in a threaded bore of a structural component and secure parts together. Properly installing a fastener into a threaded bore presents challenges.

SUMMARY

According to one aspect of the present disclosure, a blind fastener is provided. The blind fastener comprises a sleeve and a mandrel. The sleeve is adapted for installation into a threaded bore in a structure. The sleeve comprises a head portion, a first sleeve end, a second sleeve end, an elongate portion extending intermediate the first sleeve end and the second sleeve end, and a cavity extending from the first sleeve end to the second sleeve end. The mandrel is at least partially disposed through the cavity of the sleeve. The mandrel comprises a first mandrel end disposed adjacent to the first sleeve end. The first mandrel end comprises an enlarged portion having a diameter greater than a diameter of the cavity. The elongate portion is configured to at least partially deform into threads of the threaded bore responsive to forcible contact between the enlarged portion and the sleeve.

According to another aspect of the present disclosure, a blind fastener is provided. The blind fastener comprises a sleeve and a mandrel. The sleeve is adapted for installation into a threaded bore in a structure. The sleeve comprises a head portion, a first sleeve end, a second sleeve end, an elongate portion extending intermediate the first sleeve end and the second sleeve end, and a cavity extending from the first sleeve end to the second sleeve end. The mandrel is at least partially disposed through the cavity of the sleeve. The mandrel comprises a first mandrel end disposed adjacent to the first sleeve end. The first mandrel end comprises an enlarged portion having a diameter greater than a diameter of the cavity. The elongate portion is configured to at least partially deform into threads of the threaded bore responsive to forcible contact between the enlarged portion and the sleeve.

According to yet another aspect of the present disclosure, a method for fastening is provided. The method comprises inserting a first sleeve end of a sleeve of a blind fastener into a threaded bore in a structure. The blind fastener comprises the sleeve and a mandrel. The sleeve comprises a head portion configured to receive a torque, the first sleeve end, a second sleeve end, an elongate portion extending intermediate the first sleeve end and the second sleeve end, and a cavity extending from the first sleeve end to the second sleeve end. The mandrel is at least partially disposed through the cavity of the sleeve. The mandrel comprises a first mandrel end disposed adjacent to the first sleeve end. The first mandrel end comprises an enlarged portion having a diameter greater than a diameter of the cavity. The elongate portion is configured to at least partially deform into threads of the threaded bore responsive to forcible contact between the enlarged portion and the sleeve. The elongate portion is deformed onto threads of the threaded bore, thereby securing at least a portion of the blind fastener into the structure.

It will be understood that the invention disclosed and described in this specification is not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein:

FIG. 2C is a partial cross-sectional side view of the fastener and the structure of FIG. 2A in a third configuration;

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1A:
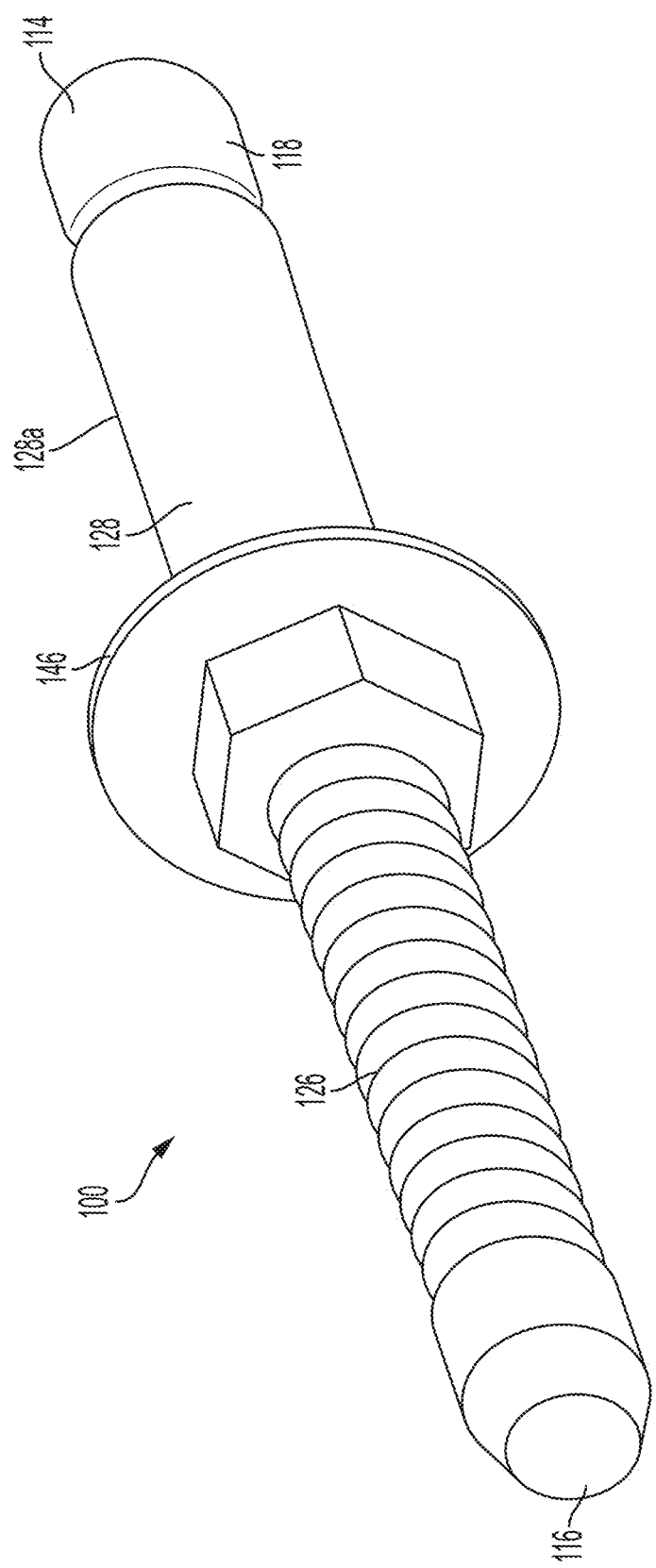
FIG. 1A is a perspective view of a non-limiting embodiment of a blind fastener according to the present disclosure.

Various examples are described and illustrated herein to provide an overall understanding of the structure, function, and use of the disclosed fastener and methods. The various examples described and illustrated herein are non-limiting and non-exhaustive. Thus, an invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments," "some embodiments," "one embodiment," "an embodiment," or like phrases mean that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural, and the use of a plural noun includes the singular, unless the context of the usage requires otherwise.

As used herein, "intermediate" means that the referenced element is disposed between two elements but is not necessarily in contact with those elements. Accordingly, unless stated otherwise herein, an element that is "intermediate" a first element and a second element may or may not be adjacent to or in contact with the first and/or second elements, and other elements may be disposed between the intermediate element and the first and/or second elements.

Securing a threaded fastener into a threaded bore can require a selection of a type of threaded fastener. For example, 1/4-20, M6 Coarse, and M6 Fine can install into a similar bore size but require a different thread pattern. Additionally, installation of a threaded fastener can require alignment of the threads on the threaded fastener and the threads in the threaded bore. An improper thread pattern or improper alignment of the threads can lead to an undesired installation of the threaded fastener (e.g., cross-threading). Moreover, a torque gauge may be needed to ensure the threaded fastener is properly inserted to the desired torque. Improper torque can result in damage to the threaded fastener and/or threaded bore and/or a securing force between the threaded fastener and structure that is less than desired. These additional steps can be time consuming, and if not properly followed, the threaded fastener may not be properly installed into the threaded bore, which can lead to failure of the structural joint. Thus, blind fasteners and methods of fastening are provided that can increase the speed of installation of a blind fastener and increase the reliability of a structural joint.

Figure 1B:
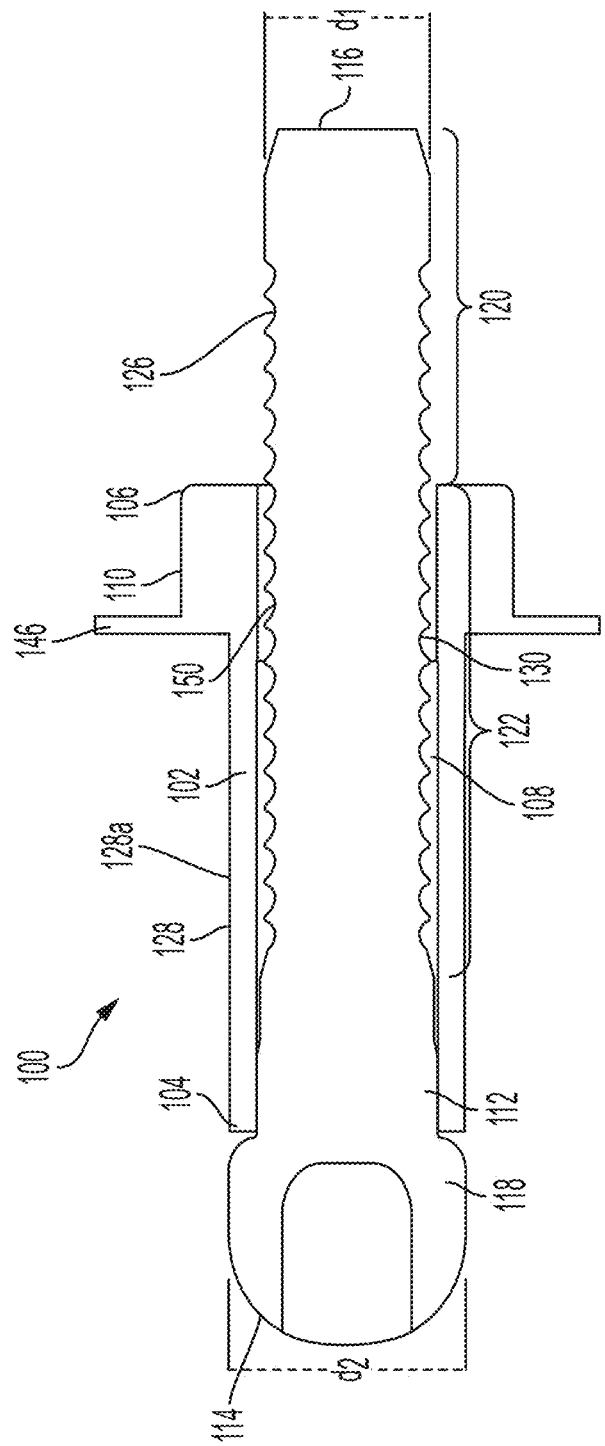
FIG. 1B is a partial cross-sectional side view of the blind fastener of FIG. 1A.

FIGS. 1A-B illustrates an embodiment of a blind fastener 100 according to the present disclosure. The blind fastener 100 can be adapted to be installed in a bore in a structure (e.g., as illustrated in FIGS. 2A-E, discussed below). The blind fastener 100 can include a sleeve 102 and a mandrel 112. In various embodiments, the sleeve 102 is generally cylindrical. For example, the sleeve 102 can be free of threads, grooves, or an annular shoulder.

FIG. 1B shows a portion of the sleeve 102 removed, exposing the mandrel 112 therein. The sleeve 102 can comprise a first sleeve end 104, a second sleeve end 106, an elongate portion 128 disposed intermediate the first sleeve end 104 and the second sleeve end 106, and a cavity 108 extending from the first sleeve end 104 to the second sleeve end 106.

The cavity 108 of the sleeve 102 can comprise a diameter, $d_1$, and be configured to at least partially receive the mandrel 112 therein. For example, the mandrel 112 can comprise a shape suitable to be received by the cavity 108, such as, for example, a generally cylindrical shape. The mandrel 112 can comprise a first mandrel end 114, a second mandrel end 116, and a shank region 122. The shank region 122 can extend intermediate the first mandrel end 114 and the second mandrel end 116 and can be at least partially disposed through the cavity 108. When the mandrel 112 is inserted in the cavity 108, the first mandrel end 114 can be disposed adjacent to the first sleeve end 104, and the second mandrel end 116 can be disposed adjacent to the second sleeve end 106.

The first mandrel end 114 can comprise an enlarged portion 118 comprising a diameter, $d_2$, which can be greater than the diameter, $d_1$, of the cavity 108. The enlarged portion 118 can engage the sleeve 102. For example, the enlarged portion 118 can engage the first sleeve end 104 and the elongate portion 128. The enlarged portion 118 can apply a force to the sleeve 102 and can deform the first sleeve end 104 and elongate portion 128 during installation of the blind fastener 100. For example, the first sleeve end 104 and/or elongate portion 128 can be deformed into threads of a threaded bore responsive to forcible contact between the enlarged portion 118 and the sleeve 102. The deformation can comprise expansion of the first sleeve end 104 and/or the elongate portion 128. The elongate portion 128 can be configured to form external threads corresponding to the threads of the threaded bore responsive to the forcible contact. For example, an outer surface 128a of the elongate portion 128 can deform into the threads of a threaded bore 234 as shown in FIGS. 2A-E below. The outer surface 128a can change shape corresponding to the threads of the threaded bore (e.g., threads can be cut into the outer surface 128a).

Upon forcible contact between the first sleeve end 104 and the enlarged portion 118, the enlarged portion 118 can deform in order to be received by the cavity 108. For example, the enlarged portion 118 can lengthen and/or reduce in diameter, de, in order to be received by the cavity 108. The enlarged portion 118 can be solid, hollow as illustrated in FIG. 1B, or axially split into or more portions.

Figure 2A:
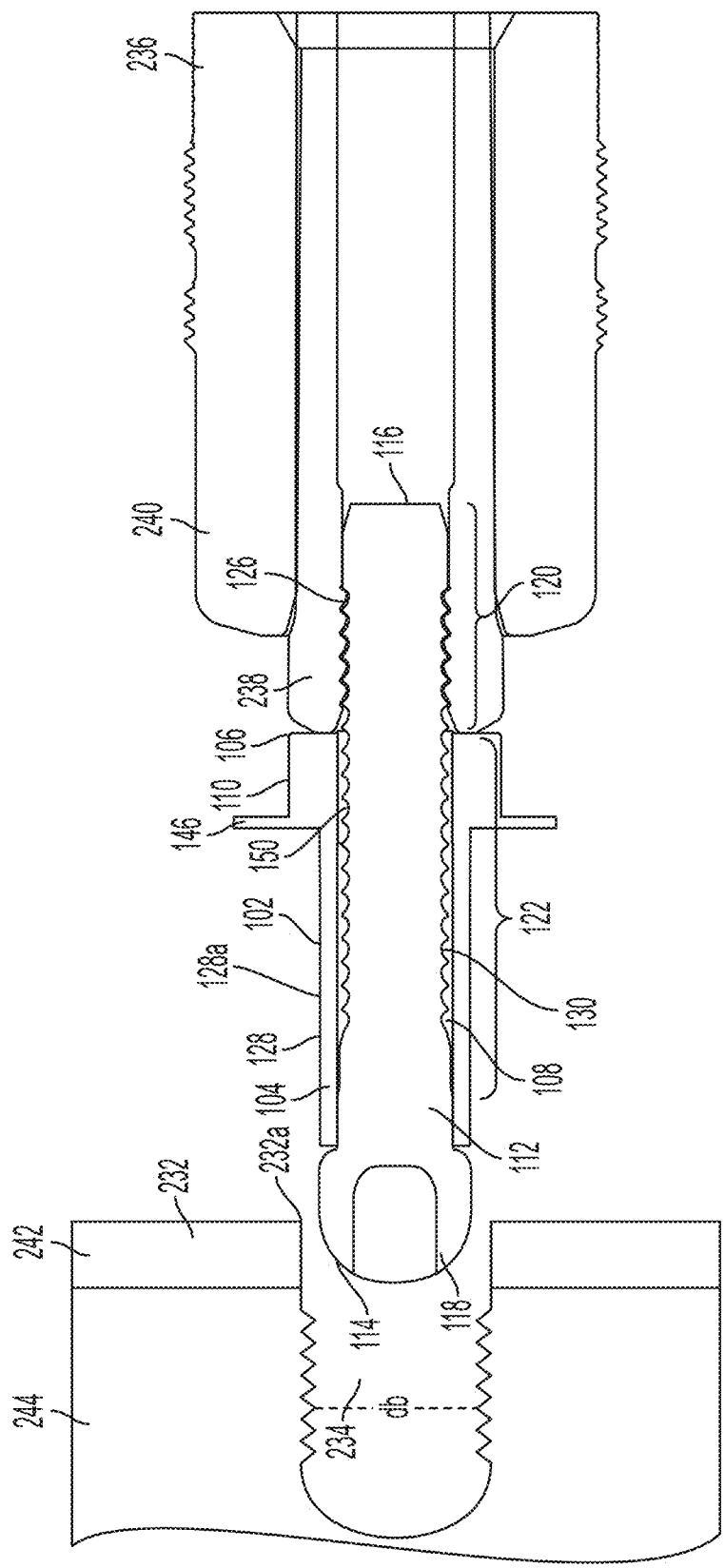
FIG. 2A is a partial cross-sectional side view of the fastener of FIG. 1A and a structure in a first configuration.
Figure 2B:
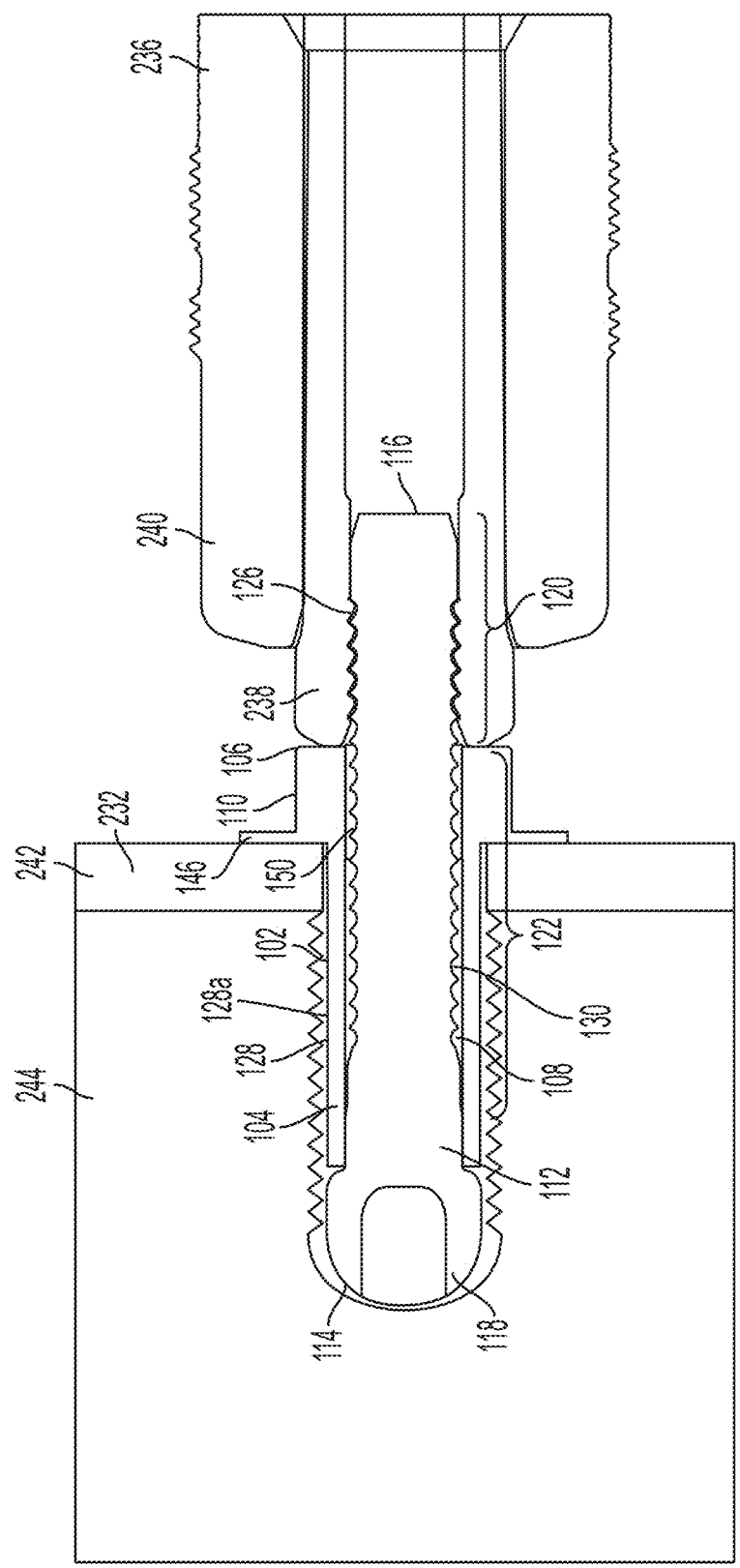
FIG. 2B is a partial cross-sectional side view of the fastener and the structure of FIG. 2A in a second configuration.

The second mandrel end 116 can comprise a pull region 120 configured to be engaged by an installation tool (e.g., installation tool 236, as illustrated in FIGS. 2A-B and discussed below). The pull region 120 can comprise an axial length and may not comprise a taper. In other embodiments, the pull region 120 can comprise a taper or a reverse taper. For example, as one moves along the pull region 120 away from the shank region 122 along a longitudinal axis of the blind fastener 100, the diameter of the pull region 120 can decrease. In certain other embodiments, the pull region 120 can comprise a reverse taper where, as one moves along the pull region 120 away from the shank region 122 along the longitudinal axis of the blind fastener 100, the diameter of the pull region 120 increases. In various embodiments, the pull region 120 can be generally conical.

Figure 4A:
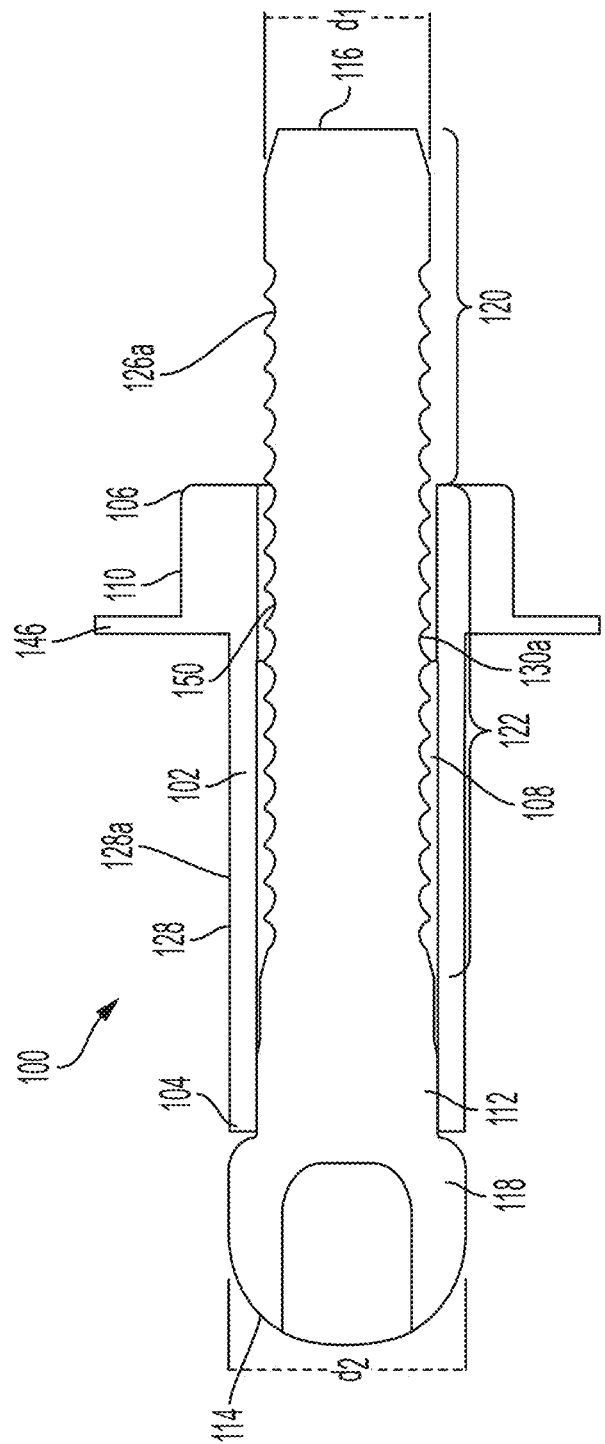
FIG. 4A is a partial cross-sectional side view of a blind fastener according to the present disclosure.
Figure 4B:
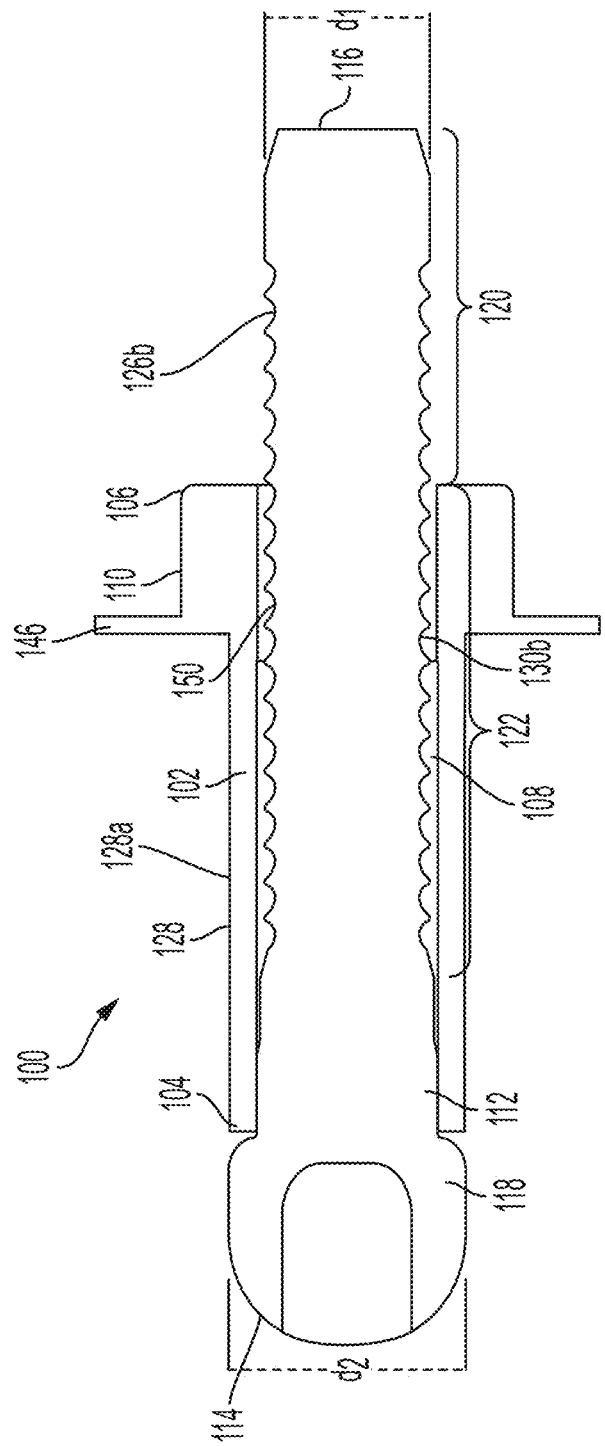
FIG. 4B is a partial cross-sectional side view of a blind fastener according to the present disclosure.

The pull region 120 can comprise at least one of a generally smooth region, an annular shoulder, a groove, and a bore or can comprise another feature configured to be engaged by an installation tool. For example, the pull region 120 can comprise grooves 126, as illustrated in FIGS. 1A-B that can be engaged by an installation tool. In various embodiments, the pull region 120 can comprise an annular shoulder 126a as illustrated in FIG. 4A that can be engaged by an installation tool. In certain embodiments, the pull region 120 can comprise threads 126b as illustrated in FIG. 4B that can be engaged by an installation tool.

The shank region 122 can define the longitudinal axis of the blind fastener 100. The shank region 122 can comprise at least one of a generally smooth region, a threaded region, an annular shoulder, and a groove. The threaded region, annular shoulder, and/or the groove can be external relative to the mandrel 112. In various embodiments, all or a portion of the shank region 122 includes grooves. For example, as shown in FIGS. 1A-B, the shank region 122 of the blind fastener 100 includes grooves 130. In other embodiments, all or a portion of the shank region 122 lacks grooves. In various embodiments, all or a portion of the shank region 122 includes an annular shoulder 130a as illustrated in FIG. 4A. In other embodiments, the shank region 122 lacks an annular shoulder. In various embodiments, all or a portion of the shank region 122 includes a threaded portion 130b as illustrated in FIG. 4B. In other embodiments, the shank region 122 lacks a threaded portion.

In various embodiments, referring against to FIGS. 1A-B, the blind fastener 100 may comprise a breakneck groove 150 or other feature configured to fracture upon installation of the blind fastener 100, or the mandrel 112 may not comprise a breakneck groove or other feature configured to fracture upon installation of the blind fastener 100. The blind fastener 100 may be installed into a structure without fracturing of the breakneck groove 150 or other feature, or the breakneck groove 150 or other feature may facture upon installation into the structure.

In various embodiments, the blind fastener 100 can comprise a single assembly of the sleeve 102 and the mandrel 112. In certain embodiments, the blind fastener 100 can consist of the sleeve 102 and the mandrel 112. In some embodiments, the blind fastener 100 can be a structural blind fastener, such as, for example, a structural blind rivet, a structural blind bolt, or a structural blind stud.

The blind fastener 100 can comprise at least one of a metal, a metal alloy, a composite material, and other material. For example, in various embodiments the blind fastener 100 can comprise at least one of aluminum, an aluminum alloy, titanium, a titanium alloy, nickel, a nickel alloy, iron, an iron alloy, a carbon fiber composite material.

The sleeve 102 can comprise a head portion 110 positioned adjacent to the second sleeve end 106. The head portion 110 can be configured to be engaged by an installation tool (e.g., installation tool 236 illustrated in FIGS. 2A-B) in order to facilitate installation of the blind fastener 100. The sleeve 102 can be configured to deform into threads of the threaded bore and swage onto the shank region 122 on an entrance side of a structure. For example, the first sleeve end 104 and/or elongate portion 128 can be deformed and the head portion 110 can be at least partially swaged onto the shank portion 122, as illustrated in FIG. 2C.

Figure 5A:
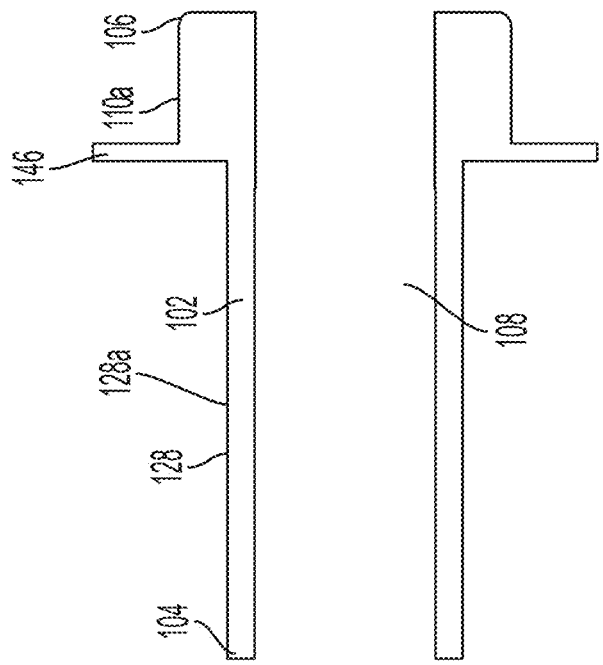
FIG. 5A is a partial cross-sectional side view of a sleeve comprising a flat side according to the present disclosure.
Figure 5B:
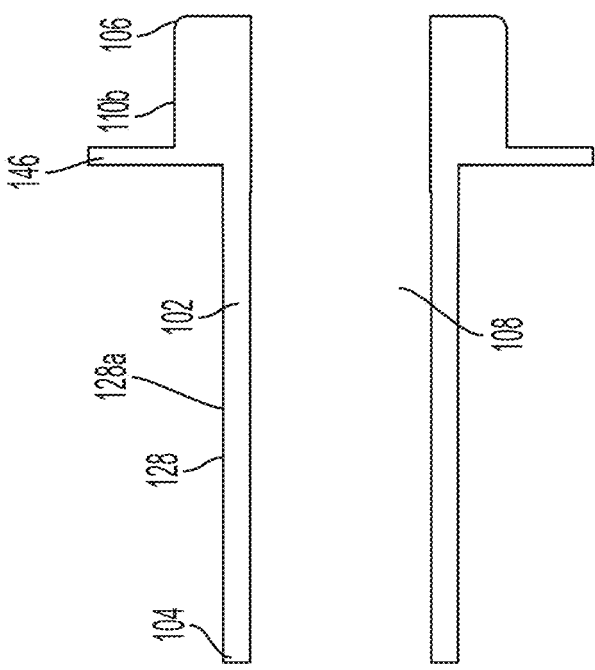
FIG. 5B is a partial cross-sectional side view of a sleeve comprising a rib according to the present disclosure.
Figure 5C:
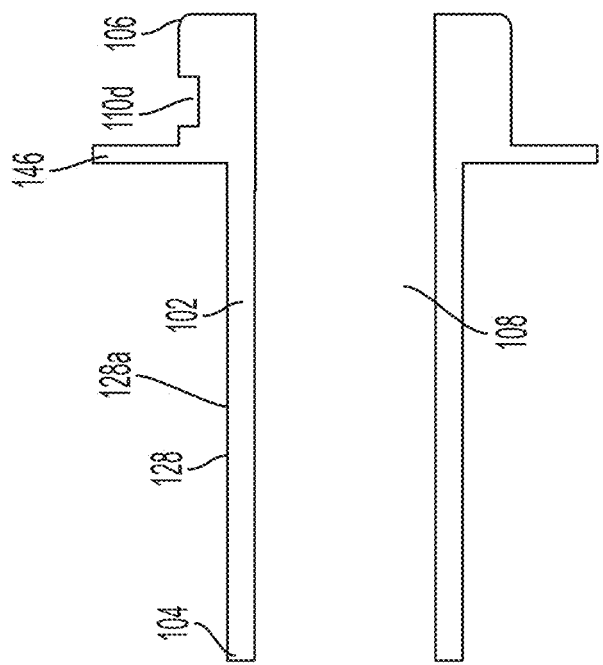
FIG. 5C is a partial cross-sectional side view of a sleeve comprising a spline according to the present disclosure.
Figure 5D:
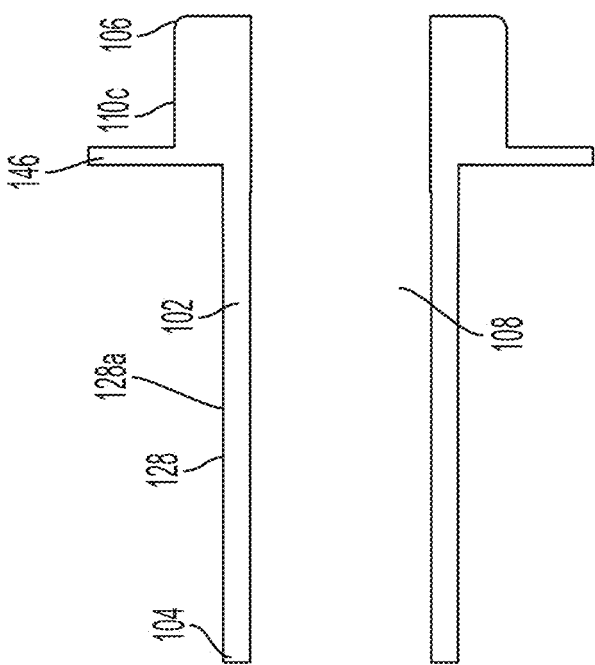
FIG. 5D is a partial cross-sectional side view of a sleeve comprising an indent according to the present disclosure.
Figure 5E:
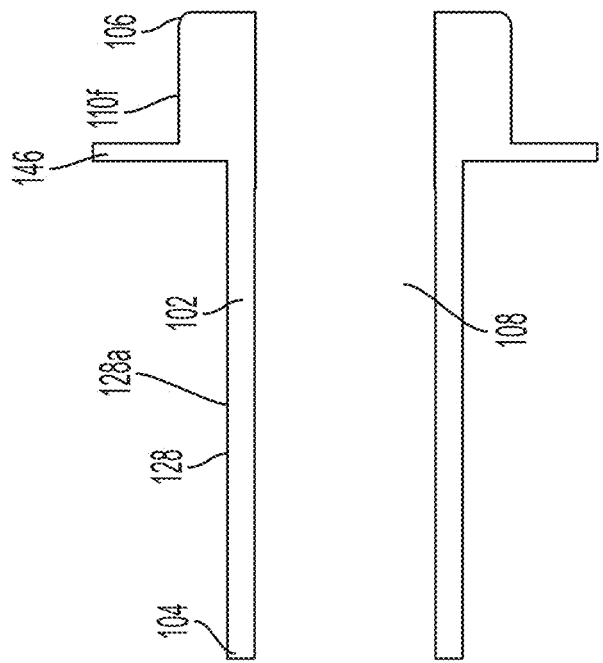
FIG. 5E is a partial cross-sectional side view of a sleeve comprising a knurl according to the present disclosure.
Figure 5F:
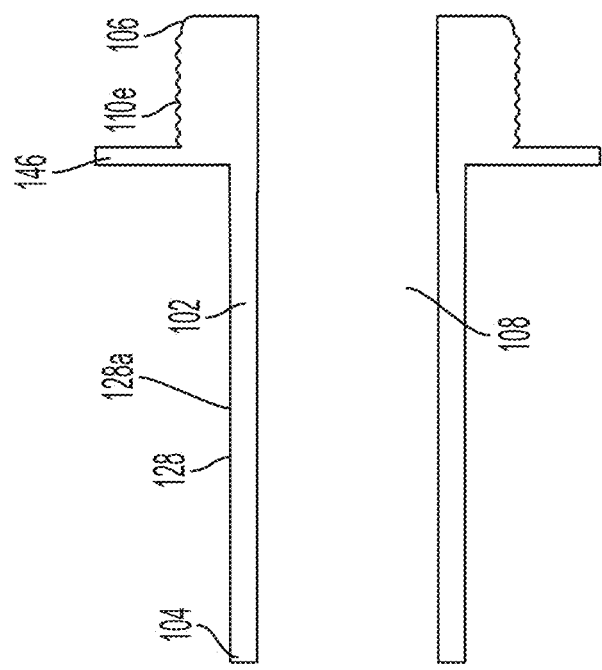
FIG. 5F is a partial cross-sectional side view of a sleeve comprising a lobe according to the present disclosure.
Figure 5G:
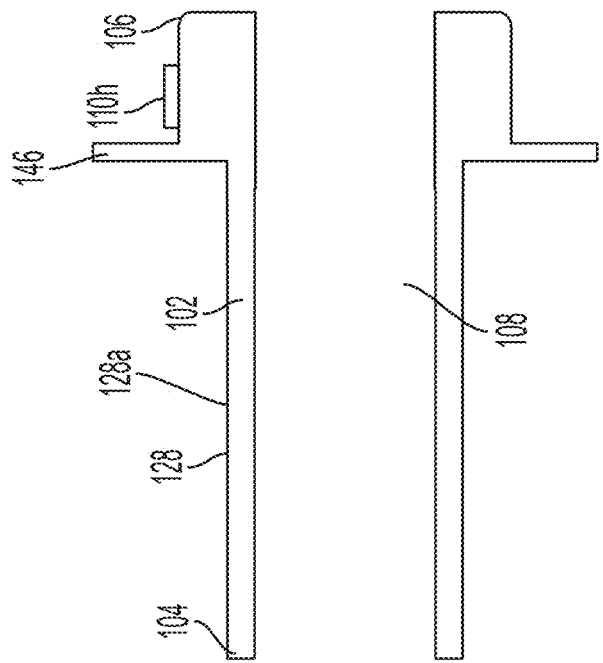
FIG. 5G is a partial cross-sectional side view of a sleeve comprising a bore according to the present disclosure.
Figure 5H:
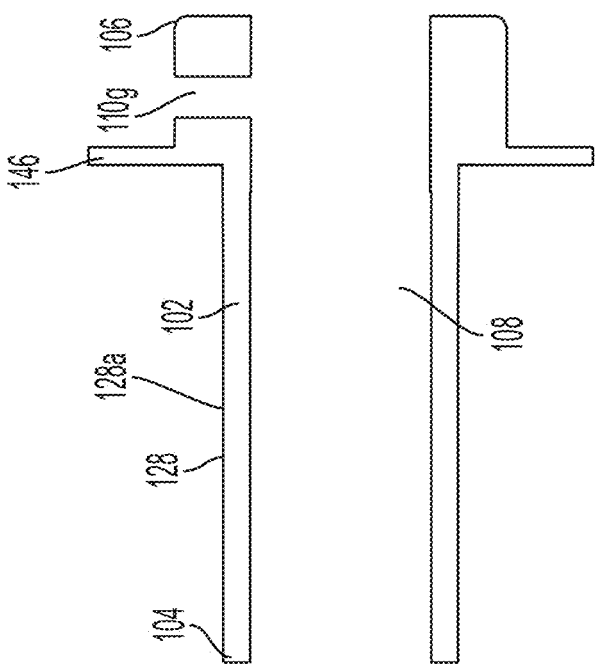
FIG. 5H is a partial cross-sectional side view of a sleeve comprising a tab according to the present disclosure.

The head portion 110 can be configured to receive a torque. For example, the head portion 110 can comprise at least one of a substantially flat side 110a as illustrated in FIG. 5A, a rib 110b as illustrated in FIG. 5B, a spline 110c as illustrated in FIG. 5C, an indent 110d as illustrated in FIG. 5D, a knurl 110e as illustrated in FIG. 5E, a lobe 110f as illustrated in FIG. 5F, a bore 110g as illustrated in FIG. 5G, and a tab 110h as illustrated in FIG. 5H. For example, the head portion 110 can be at least one of a square head portion, a hex head portion, a knurled head portion, and a splined head portion. In various other embodiments, the head portion 110 can be generally cylindrical. In various embodiments, a flange 146 is disposed adjacent to the head portion 110.

In various embodiments, referring again to FIG. 1, the mandrel 112 and sleeve 102 can comprise a stepped lock region. The stepped lock region can comprise two or more progressive counterbores in the sleeve 102 with stepped diameters matched to grooves on the mandrel 112. The grooves on the mandrel 112 can be configured to receive deformed sleeve material from the progressive counterbores to form a mechanical lock between the mandrel 112 and the sleeve 102.

As illustrated in FIGS. 2A-E, the blind fastener 100 can be installed into a threaded bore 234 in a structure 232. The threaded bore 234 can be at least partially threaded. For example, the threaded bore 234 can be completely threaded or the threaded bore 234 can comprise a section of threads and a generally smooth section. As illustrated, the threaded bore 234 may not extend through the structure 232 (e.g., a blind hole). The structure 232 can comprise, for example, at least one of a metal, a metal alloy, a composite material, and other material. For example, in certain embodiments, the structure 232 can comprise at least one of aluminum, an aluminum alloy, titanium, a titanium alloy, nickel, a nickel alloy, iron, an iron alloy, and a carbon fiber composite material.

In various embodiments, the structure 232 into which the blind fastener 100 is assembled comprises aluminum and/or an aluminum alloy such as, for example, 7075 aluminum. With reference to the accompanying figures, the structure 232 can be configured as at least one of an aerospace component or structure, an automotive component or structure, a transportation component or structure, a building and construction component or structure, and other structure. The structure 232 can comprise a single layer of material or at least two layers of material. For example, as illustrated in FIGS. 2A-E, the structure 232 can comprise a first layer 242 and a second layer 244. Upon installation into the threaded bore 234, the blind fastener 100 can secure the first layer 242 and the second layer 244 together, as illustrated in FIG. 2C.

As illustrated in FIG. 2A, in a first configuration of the blind fastener 100 and the structure 232, the first mandrel end 114 of the blind fastener 100 can be positioned in alignment with the threaded bore 234. To facilitate alignment of the blind fastener 100 with the threaded bore 234, the threaded bore 234 can have a diameter, $d_b$, (e.g., internal diameter of the threads) that is greater than the diameter, $d_2$, of the enlarged portion 118 of the first mandrel end 114, thereby allowing the mandrel 112 to readily move into and through the threaded bore 234 when passing from a first configuration of the blind fastener 100 and the structure 232, illustrated in FIG. 2A, to a second configuration, illustrated in FIG. 2B. In various embodiments, the diameter, do, of the threaded bore 234 can be less than the diameter, $d_2$, of the enlarged portion 118 and/or a diameter of the sleeve 102 to allow the sleeve 102 to readily pass into the threaded bore 234.

A diameter of the head portion 110 and/or flange 146 can be greater than the diameter, $d_b$, of the threaded bore 234 in order to inhibit the sleeve 102 from further traversal into the threaded bore 234. In the second configuration, shown in FIG. 2B, the first mandrel end 114 has passed into the threaded bore 234 and the head portion 110 of the sleeve 102 or the flange 146 can be in forcible contact with the structure 232 at an entrance side 232a (FIG. 2A) of the structure 232. The forcible contact between the head portion 110 or flange 146 and the structure 232 can limit further axial movement of the sleeve 102 into the threaded bore 234.

Before or after insertion, a collet 238 of the installation tool 236 can engage the pull region 120 of the blind fastener 100. For example, the collet 238 can be configured to forcibly contact an anvil 240 of the installation tool 236. The forcible contact can close the collet 238 around the pull region 120 where the collet 238 forcibly contacts the pull region 120. Upon engagement, the collet 238 can apply a force to the pull region 120 of the mandrel 112.

The collet 238 can move the mandrel 112 independently of the sleeve 102. For example, the collet 238 can retract within the installation tool 236 and move the mandrel 112 as the collet 238 retracts due to the contact between the pull region 120 and the collet 238. Upon the collet 238 reaching a predetermined retraction distance into the installation tool 236, the anvil 240 can forcibly contact the second sleeve end 106 (e.g., head portion 110). The forcible contact between the second sleeve end 106 and the anvil 240 can move the second mandrel end 116 in a vector different than a vector of a force applied to the second sleeve end 106. For example, the installation tool 236 can move the pull region 120 distal from the head portion 110 utilizing the collet 238 of the installation tool 236.

In a third configuration of the blind fastener 100 and the structure 232 illustrated in FIG. 2C, the first sleeve end 104 and/or the elongate portion 128 can be deformed responsive to forcible contact from mandrel 112. For example, the first sleeve end 104 and/or elongate portion 128 can be deformed into threads of the threaded bore 234 responsive to forcible contact between the enlarged portion 118 and the sleeve 102. The first sleeve end 104 and elongate portion 128 can be expanded and form external threads corresponding to the threads of the threaded bore 234 responsive to the forcible contact.

Upon forcible contact between the first sleeve end 104 and the enlarged portion 118, the enlarged portion 118 can be deformed in order to be received by the cavity 108. For example, the enlarged portion 118 can be received by the cavity 108 of the sleeve 102 by reducing the diameter, $d_2$, of the enlarged portion 118.

The second sleeve end 106 can be swaged onto the shank region 122 on the entrance side 232a of the structure 232 responsive to forcible contact from the anvil 240. For example, the head portion 110 can be swaged onto the shank region 122. The swaging of the second sleeve end 106 and/or deformation of the first sleeve end 104 and/or elongate portion 128 can secure at least a portion of the blind fastener 100 in the structure 232. In that way, for example, the first layer 242 and second layer 244 of the structure 232 are secured together.

Figure 2D:
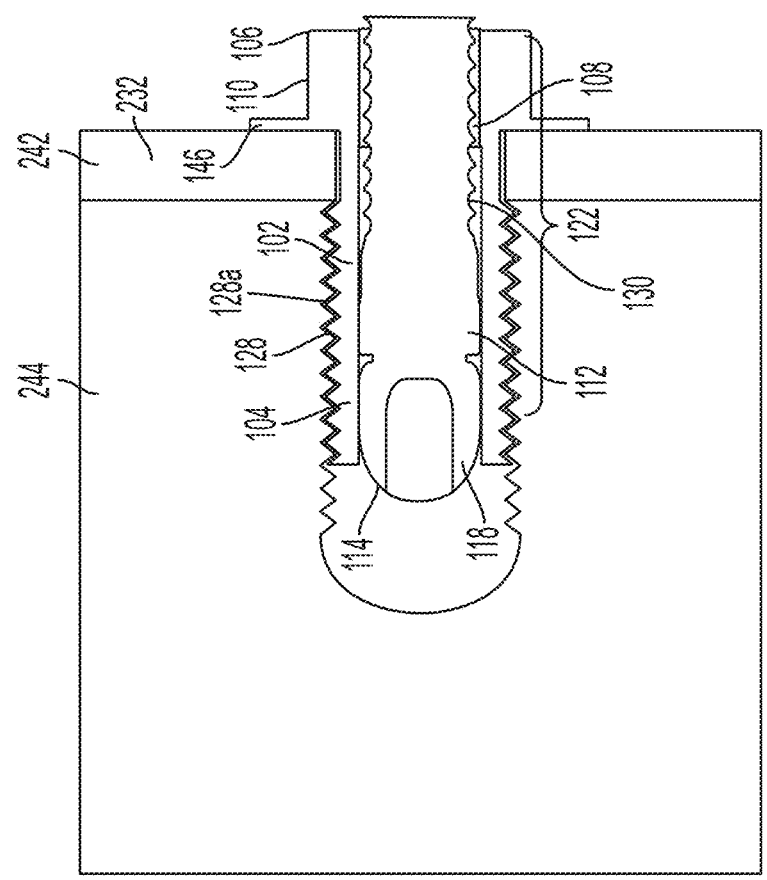
FIG. 2D is a partial cross-sectional side view of the fastener and the structure of FIG. 2A in a fourth configuration.

As illustrated in FIG. 2C, the mandrel 112 may not fracture after installation into the structure 232, or as shown in FIG. 2D, the mandrel 112 may fracture along breakneck groove 150 after installation into the structure 232 in a fourth configuration of the blind fastener 100 and the structure 232.

The blind fastener 100 can be removed from the threaded bore 234 by rotating the blind fastener 100. For example, a torque can be applied to the head portion 110 of the blind fastener 100. In embodiments where the threads in the threaded bore 234 are right-handed threads, the blind fastener can be removed by rotating the blind fastener 100 in a counter-clockwise direction (when viewing from the second sleeve end 106 of the sleeve 102 to the first sleeve end 104 of the sleeve 102). In embodiments where the threads in the threaded bore 234 are left-handed threads, the blind fastener 100 can be removed by rotating the blind fastener 100 in a clockwise direction (when viewing from the second sleeve end 106 of the sleeve 102 to the first sleeve end 104 of the sleeve 102).

Figure 2E:
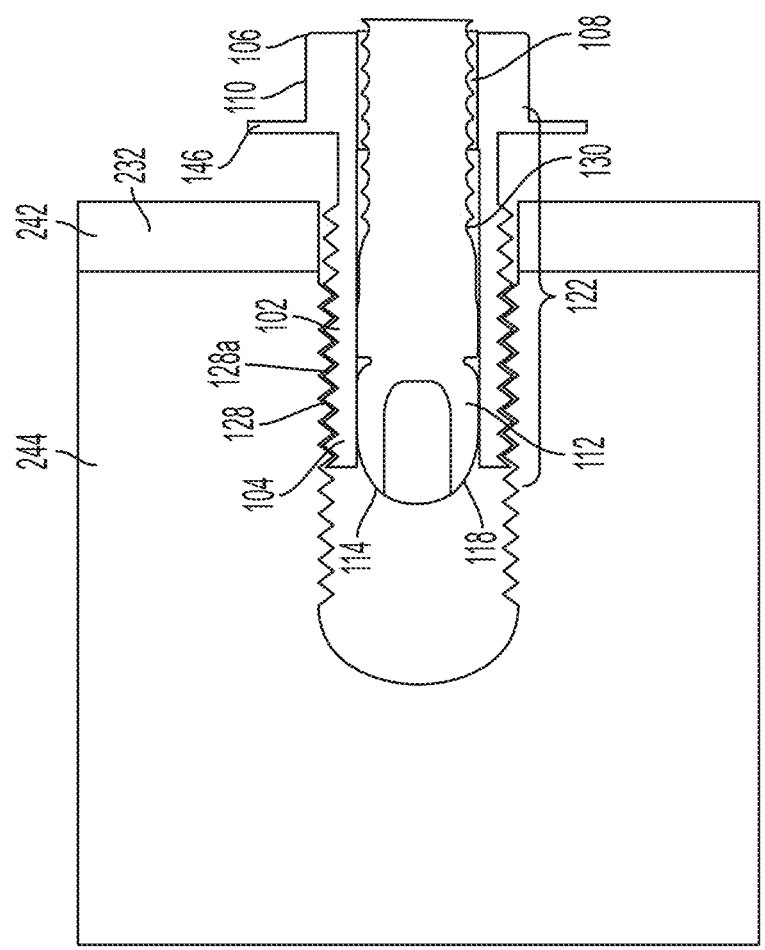
FIG. 2E is a partial cross-sectional side view of the fastener and the structure of FIG. 2A in a fifth configuration.
Figure 3:
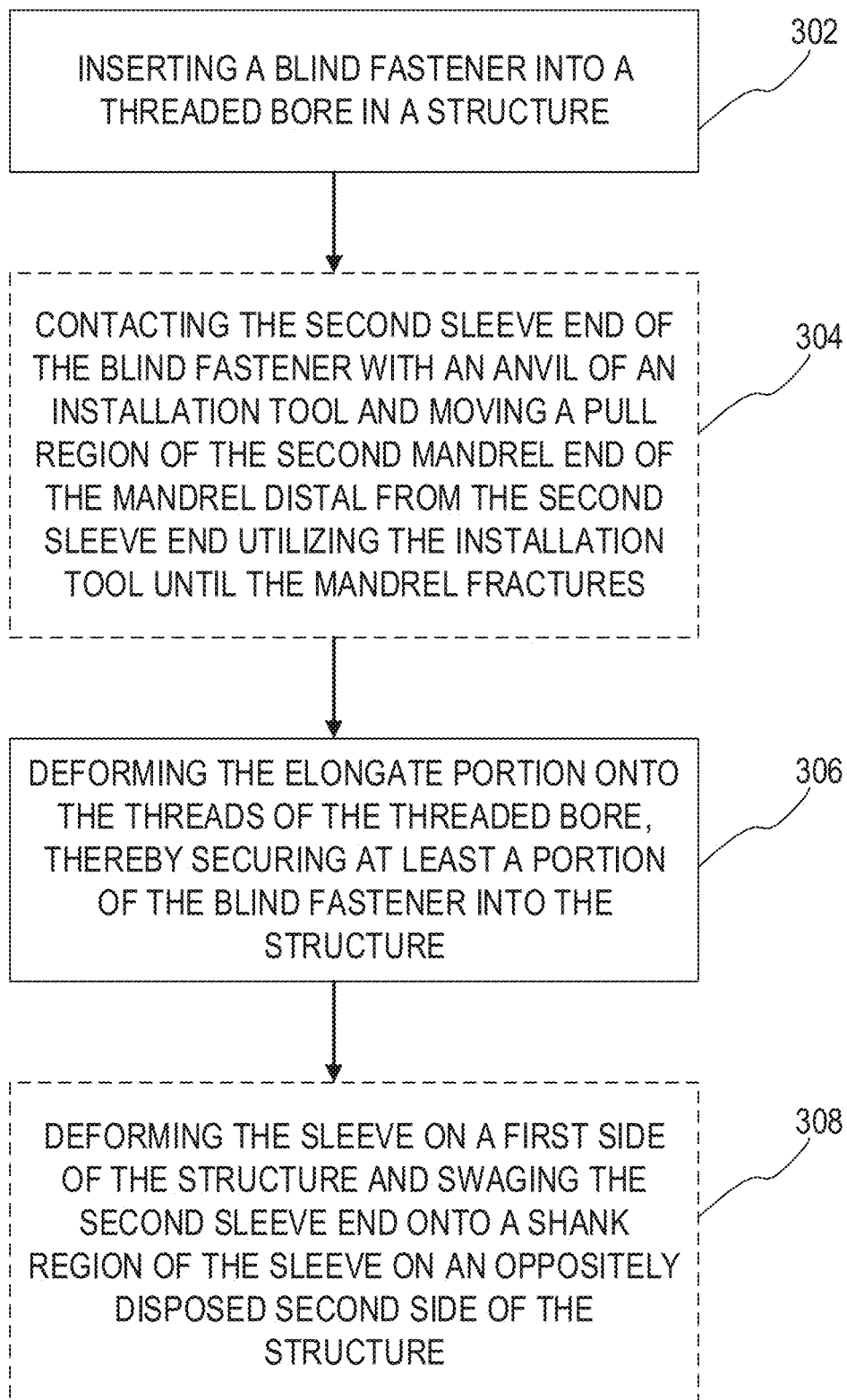
FIG. 3 is a method for fastening in accordance with the present disclosure.

In a fifth configuration of the blind fastener 100 and the structure 232 illustrated in FIG. 2E, the blind fastener 100 can be at least partially removed from the threaded bore 234. For example, the blind fastener 100 can be completely removed from the threaded bore 234 by rotating the blind fastener 100. In that way, for example, the first layer 242 and second layer 244 of the structure 232 may be unsecured.

In various embodiments, the blind fastener 100 can be used in a method for fastening the structure 232. The method can comprise inserting the first sleeve end 104 into the threaded bore 234 in the structure 232. The collet 238 of the installation tool 236 can engage with the pull region 120 of the blind fastener 100. After inserting the blind fastener 100 into the threaded bore 234, the second sleeve end 106 of the blind fastener 100 can contact the anvil 240 of the installation tool 236. The pull region 120 can be moved distal from the head portion 110 utilizing the collet 238 of the installation tool 236. In various embodiments, the pull region 120 can be moved distal from the head portion 110 utilizing the collet 238 of the installation tool until the mandrel 112 fractures (e.g., at the breakneck groove 150 or other feature configured to fracture).

The sleeve 102 can be deformed onto the threads of the threaded bore 234, thereby securing at least a portion of the blind fastener 100 in the structure 232. Deforming the sleeve 102 can comprise forming external threads on the elongate portion 128, wherein the external threads correspond to the threads of the threaded bore 234. The second sleeve end 106 can be swaged onto the shank region 122 of the mandrel 112 on the entrance side 232a of the structure 232.

Various aspects of the invention include, but are not limited to, the aspects listed in the following numbered clauses.

Clause 1. A blind fastener comprising: a sleeve adapted for installation into a threaded bore in a structure, the sleeve comprising a head portion, a first sleeve end, a second sleeve end, an elongate portion extending intermediate the first sleeve end and the second sleeve end, and a cavity extending from the first sleeve end to the second sleeve end; and a mandrel at least partially disposed through the cavity of the sleeve, the mandrel comprising a first mandrel end disposed adjacent to the first sleeve end and comprising an enlarged portion having a diameter greater than a diameter of the cavity; wherein the elongate portion is configured to at least partially deform into threads of the threaded bore responsive to forcible contact between the enlarged portion and the sleeve.

Clause 2. The blind fastener of clause 1, wherein the elongate portion is configured to form external threads corresponding to the threads of the threaded bore responsive to the forcible contact.

Clause 3. The blind fastener of any of clauses 1-2, wherein the enlarged portion is solid, hollow, or axially split into or more portions.

Clause 4. The blind fastener of any of clauses 1-3, wherein the mandrel comprises a stepped lock region.

Clause 5. The blind fastener of any of clauses 1-4, wherein the mandrel further comprises: a second mandrel end comprising a pull region, and a shank region extending between the first mandrel end and the second mandrel end, wherein the shank region is at least partially disposed through the cavity of the sleeve.

Clause 6. The blind fastener of clause 5, wherein the shank region comprises at least one of a generally smooth region, threads, an annular shoulder, and a groove.

Clause 7. The blind fastener of one of clauses 5-6, wherein the pull region comprises at least one of a generally smooth region, threads, an annular shoulder, and a groove.

Clause 8. The blind fastener of any of clauses 1-7, wherein the mandrel comprises a breakneck groove.

Clause 9. The blind fastener of any of clauses 1-8, wherein the sleeve is generally cylindrical and the mandrel is generally cylindrical.

Clause 10. The blind fastener of any of clauses 1-9, wherein the head portion comprises at least one feature configured to receive a torque selected from at least one of a substantially flat side, a rib, a spline, an indent, a knurl, a lobe, a bore, and a tab.

Clause 11. The blind fastener of any of clauses 1-10, further comprising a flange disposed adjacent to the head portion.

Clause 12. The blind fastener of any of clauses 1-11, wherein the blind fastener comprises at least one of a metal, a metal alloy, and a composite material.

Clause 13. The blind fastener of any of clauses 1-12, wherein the structure comprises at least one of a metal, a metal alloy, and a composite material.

Clause 14. The blind fastener of any of clauses 1-13, wherein the structure is configured as at least one of an aerospace part or component, an automotive part or component, a transportation part or component, and a building and construction part or component.

Clause 15. A blind fastener comprising: a sleeve adapted for installation into a threaded bore in a structure, the sleeve comprising a head portion configured to receive a torque, a first sleeve end, a second sleeve end, an elongate portion extending intermediate the first sleeve end and the second sleeve end, and a cavity extending from the first sleeve end to the second sleeve end; and a mandrel at least partially disposed through the cavity of the sleeve, the mandrel comprising a first mandrel end disposed adjacent to the first sleeve end and comprising an enlarged portion having a diameter greater than a diameter of the cavity; wherein the elongate portion is configured to at least partially deform into threads of the threaded bore responsive to forcible contact between the enlarged portion and the sleeve.

Clause 16. A method for fastening, the method comprising: inserting a blind fastener into a threaded bore in a structure, the blind fastener comprising: a sleeve adapted for installation into the threaded bore, the sleeve comprising a head portion, a first sleeve end, a second sleeve end, an elongate portion extending intermediate the first sleeve end and the second sleeve end, and a cavity extending from the first sleeve end to the second sleeve end; and a mandrel configured to be at least partially disposed through the cavity of the sleeve, the mandrel comprising a first mandrel end disposed adjacent to the first sleeve end and comprising an enlarged portion having a diameter greater than a diameter of the cavity; and deforming the elongate portion onto threads of the threaded bore, thereby securing at least a portion of the blind fastener into the structure.

Clause 17. The method of clause 16, wherein deforming the sleeve further comprises forming external threads on the elongate portion, wherein the external threads correspond to the threads of the threaded bore.

Clause 18. The method of any of clauses 16-17, further comprising, after the inserting, forcibly contacting the second sleeve end of the blind fastener with an anvil of an installation tool and moving a pull region of a second mandrel end of the mandrel distal from the second sleeve end utilizing the installation tool until the mandrel fractures.

Clause 19. The method of clause 18, further comprising: deforming the sleeve on a first side of the structure, and swaging the second sleeve end onto a shank region of the sleeve on an oppositely disposed second side of the structure.

Clause 20. The method of any of clauses 16-19, wherein the structure is configured as at least one of an aerospace part or component, an automotive part or component, a transportation part or component, and a building and construction part or component.

One skilled in the art will recognize that the herein described fasteners, structures, operations/actions, and objects, and the discussion accompanying them, are used as examples for the sake of conceptual clarity and that various configuration modifications are contemplated. Consequently, as used herein, the specific examples/embodiments set forth and the accompanying discussion are intended to be representative of their more general classes. In general, use of any specific exemplar is intended to be representative of its class, and the non-inclusion of specific components, devices, apparatus, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:

1. A blind fastener comprising:
a sleeve adapted for installation into a threaded bore in a structure, the sleeve comprising
a head portion wherein the head portion comprises at least one feature configured to receive a torque selected from the group consisting of a substantially flat side, a rib, a spline, an indent, a knurl, a lobe, a bore, and a tab,
a first sleeve end,
a second sleeve end,
an elongate portion extending intermediate the first sleeve end and the second sleeve end, and
a cavity extending from the first sleeve end to the second sleeve end; and
a mandrel at least partially disposed through the cavity of the sleeve, the mandrel comprising
a first mandrel end disposed adjacent to the first sleeve end and comprising an enlarged portion having a diameter greater than a diameter of the cavity, wherein the enlarged portion is hollow;
wherein the elongate portion is configured to at least partially deform into threads of the threaded bore thereby forming external threads on the elongate portion and the diameter of the enlarged portion is configured to be at least partially reduced responsive to forcible contact between the enlarged portion and the sleeve,
wherein the blind fastener is capable of removal from the threads in the threaded bore after forming the external threads by rotation of the blind fastener.

2. The blind fastener of claim 1, wherein the external threads is configured to correspond to the threads of the threaded bore.

3. The blind fastener of claim 1, wherein the mandrel further comprises:
a second mandrel end comprising a pull region, and
a shank region extending between the first mandrel end and the second mandrel end, wherein the shank region is at least partially disposed through the cavity of the sleeve.

4. The blind fastener of claim 3, wherein the shank region comprises at least one of a generally smooth region, threads, an annular shoulder, and a groove.

5. The blind fastener of claim 3, wherein the pull region comprises at least one of a generally smooth region, threads, an annular shoulder, and a groove.

6. The blind fastener of claim 1, wherein the mandrel comprises a breakneck groove.

7. The blind fastener of claim 1, wherein the sleeve is generally cylindrical and the mandrel is generally cylindrical.

8. The blind fastener of claim 1, further comprising a flange disposed adjacent to the head portion.

9. The blind fastener of claim 1, wherein the blind fastener comprises at least one of a metal, a metal alloy, and a composite material.

10. The blind fastener of claim 1, wherein the structure comprises at least one of a metal, a metal alloy, and a composite material.

11. The blind fastener of claim 1, wherein the structure is configured as at least one of an aerospace part or component, an automotive part or component, a transportation part or component, and a building and construction part or component.

12. A blind fastener comprising:
a sleeve comprising
a head portion, wherein the head portion comprises at least one feature configured to receive a torque selected from the group consisting of a substantially flat side, a rib, a spline, an indent, a knurl, a lobe, a bore, and a tab,
a first sleeve end,
a second sleeve end,
an elongate portion extending intermediate the first sleeve end and the second sleeve end, and
a cavity extending from the first sleeve end to the second sleeve end; and
a mandrel at least partially disposed through the cavity of the sleeve, the mandrel comprising
a first mandrel end disposed adjacent to the first sleeve end and comprising an enlarged portion having a diameter greater than a diameter of the cavity, wherein the enlarged portion is hollow;
wherein the elongate portion is configured to at least partially deform into threads of the threaded bore thereby forming external threads on the elongate portion and the diameter of the enlarged portion is configured to be at least partially reduced responsive to forcible contact between the enlarged portion and the sleeve,
wherein the blind fastener is capable of removal from the threads in the threaded bore after forming the external threads by rotation of the blind fastener.

13. A method for fastening, the method comprising:
inserting a blind fastener into a threaded bore in a structure, the blind fastener comprising:
a sleeve adapted for installation into the threaded bore, the sleeve comprising
a head portion,
a first sleeve end,
a second sleeve end,
an elongate portion extending intermediate the first sleeve end and the second sleeve end, and
a cavity extending from the first sleeve end to the second sleeve end; and
a mandrel configured to be at least partially disposed through the cavity of the sleeve, the mandrel comprising
a first mandrel end disposed adjacent to the first sleeve end and comprising an enlarged portion having a diameter greater than a diameter of the cavity, wherein the enlarged portion is hollow; and
deforming the elongate portion onto threads of the threaded bore and reducing the diameter of the enlarged portion, thereby securing at least a portion of the blind fastener into the structure.

14. The method of claim 13, wherein deforming the sleeve further comprises forming external threads on the elongate portion, wherein the external threads correspond to the threads of the threaded bore.

15. The method of claim 13, further comprising, after the inserting, forcibly contacting the second sleeve end of the blind fastener with an anvil of an installation tool and moving a pull region of a second mandrel end of the mandrel distal from the second sleeve end utilizing the installation tool until the mandrel fractures.

16. The method of claim 15, further comprising:
    deforming the sleeve on a first side of the structure, and swaging the second sleeve end onto a shank region of the sleeve on an oppositely disposed second side of the structure.

17. The method of claim 13, wherein the structure is configured as at least one of an aerospace part or component, an automotive part or component, a transportation part or component, and a building and construction part or component.

* * * * *